US006770107B2

(12) United States Patent
Teutsch et al.

(10) Patent No.: US 6,770,107 B2
(45) Date of Patent: Aug. 3, 2004

(54) ABRASIVE-FILLED THERMOSET COMPOSITION AND ITS PREPARATION, AND ABRASIVE-FILLED ARTICLES AND THEIR PREPARATION

(75) Inventors: Erich Otto Teutsch, Richmond, MA (US); Gary William Yeager, Schenectady, NY (US); Kenneth Paul Zarnoch, Scotia, NY (US); Steven William Webb, Worthington, OH (US); Hua Guo, Selkirk, NY (US)

(73) Assignee: General Electric Company, Pittsfield, MA (US)

( * ) Notice: Subject to any disclaimer, the term of this patent is extended or adjusted under 35 U.S.C. 154(b) by 23 days.

(21) Appl. No.: 10/248,587

(22) Filed: Jan. 30, 2003

(65) Prior Publication Data

US 2003/0153641 A1 Aug. 14, 2003

Related U.S. Application Data

(62) Division of application No. 09/681,381, filed on Mar. 27, 2001, now Pat. No. 6,593,391.

(51) Int. Cl.$^7$ .............................. C08J 5/14; C08F 2/46
(52) U.S. Cl. ............................ 51/298; 51/309; 51/293; 264/478; 264/494; 264/496; 428/500; 524/430; 524/440; 524/441; 524/432; 524/433; 524/436; 524/437; 524/438; 525/132; 525/390; 525/391; 525/397; 528/137; 528/138; 528/139; 528/154; 528/159; 528/160; 528/161
(58) Field of Search ............................ 522/81, 71, 73, 522/83, 77, 167, 160, 134, 135, 142, 144; 524/430, 432, 433, 436, 437, 438, 440, 441; 525/132, 390, 391, 397; 528/137, 138, 139, 154, 159, 160, 161; 51/298, 309, 293; 428/500

(56) References Cited

U.S. PATENT DOCUMENTS

| | | |
|---|---|---|
| 3,219,625 A | 11/1965 | Blanchard et al. |
| 3,268,561 A | 8/1966 | Peppel et al. |
| 3,306,875 A | 2/1967 | Hay |
| 3,375,228 A | 3/1968 | Holoch et al. |
| 3,557,045 A | 1/1971 | Wright et al. |
| 3,597,216 A | 8/1971 | Berardinelli et al. |
| 3,637,578 A | 1/1972 | Wright et al. |
| 3,883,612 A | 5/1975 | Pratt et al. |
| 3,936,414 A | 2/1976 | Wright et al. |
| 3,960,516 A | 6/1976 | Biardi |
| 4,028,341 A | 6/1977 | Hay |
| 4,048,143 A | 9/1977 | Hay et al. |
| 4,054,425 A | 10/1977 | Sherman |
| 4,088,729 A | 5/1978 | Sherman |
| 4,092,294 A | 5/1978 | Bennett, Jr. et al. |
| 4,148,843 A | 4/1979 | Goossens |
| 4,165,422 A | 8/1979 | White |
| 4,327,013 A | 4/1982 | Peters |
| 4,440,923 A | 4/1984 | Bartmann et al. |
| RE31,883 E | 5/1985 | Bovenkerk et al. |
| 4,562,243 A | 12/1985 | Percec |
| 4,565,684 A | 1/1986 | Tibbetts et al. |
| 4,572,813 A | 2/1986 | Arakawa |
| 4,604,417 A | 8/1986 | Cottman |
| 4,618,703 A | 10/1986 | Thanawalla et al. |
| 4,634,742 A | 1/1987 | Percec |
| 4,663,230 A | 5/1987 | Tennent |
| 4,663,402 A | 5/1987 | Percec et al. |
| 4,665,137 A | 5/1987 | Percec |
| 4,677,185 A | 6/1987 | Heitz et al. |
| 4,701,514 A | 10/1987 | Percec |
| 4,760,118 A | 7/1988 | White et al. |
| 4,806,601 A | 2/1989 | Percec |
| 4,816,289 A | 3/1989 | Komatsu et al. |
| 4,816,515 A | 3/1989 | Weiss |
| 4,871,816 A | 10/1989 | Percec et al. |
| 4,874,826 A | 10/1989 | Sakamoto et al. |
| 4,876,078 A | 10/1989 | Arakawa et al. |
| 4,888,397 A | 12/1989 | van der Meer et al. |
| 4,923,932 A | 5/1990 | Katayose et al. |
| 5,024,818 A | 6/1991 | Tibbetts et al. |
| 5,039,781 A | 8/1991 | Neugebauer et al. |
| 5,061,602 A | 10/1991 | Koch et al. |
| 5,071,922 A | 12/1991 | Nelissen et al. |
| 5,079,268 A | 1/1992 | Nelissen et al. |
| 5,091,480 A | 2/1992 | Percec |
| 5,118,748 A | 6/1992 | Fujita et al. |
| 5,165,909 A | 11/1992 | Tennent et al. |
| 5,167,674 A | 12/1992 | Ika |
| 5,171,761 A | 12/1992 | Penco et al. |
| 5,200,122 A | 4/1993 | Katoh et al. |
| 5,213,886 A | 5/1993 | Chao et al. |
| 5,218,030 A | 6/1993 | Katayose et al. |
| 5,219,951 A | 6/1993 | Nelissen et al. |
| 5,240,973 A | 8/1993 | Katoh et al. |
| 5,304,600 A | 4/1994 | Nelissen et al. |
| 5,306,318 A | 4/1994 | Carius et al. |
| 5,310,820 A | 5/1994 | Nelissen et al. |
| 5,314,512 A | 5/1994 | Sexton |
| 5,338,796 A | 8/1994 | Vianello et al. |
| 5,352,745 A | 10/1994 | Katayose et al. |
| 5,407,972 A | 4/1995 | Smith et al. |
| 5,589,152 A | 12/1996 | Tennent et al. |
| 5,591,382 A | 1/1997 | Nahass et al. |
| 5,834,565 A | 11/1998 | Tracy et al. |
| 5,851,646 A | 12/1998 | Takahashi et al. |
| 5,885,149 A | 3/1999 | Gillet et al. |
| 5,922,815 A | 7/1999 | Aycock et al. |
| 5,965,663 A | 10/1999 | Hayase |
| 6,022,550 A | 2/2000 | Watanabe |
| 6,306,963 B1 | 10/2001 | Lane et al. |
| 6,352,782 B2 | 3/2002 | Yeager et al. |
| 6,384,176 B1 | 5/2002 | Braat et al. |
| 2001/0049046 A1 | 12/2001 | Butler |
| 2001/0053820 A1 | 12/2001 | Yeager et al. |
| 2002/0005508 A1 | 1/2002 | Butler et al. |
| 2002/0028337 A1 | 3/2002 | Yeager et al. |
| 2002/0077447 A1 | 6/2002 | Hwang et al. |

*Primary Examiner*—Rabon Sergent
*Assistant Examiner*—Sanza McClendon

(57) ABSTRACT

A curable resin composition comprises a poly(arylene ether), an acryloyl monomer, an allylic monomer, and an abrasive filler. The composition tolerates high filler contents, cures rapidly, and exhibits excellent toughness after curing. Useful articles prepared from the composition include grinding wheels and cut-off wheels having good wear characteristics.

49 Claims, No Drawings

ABRASIVE-FILLED THERMOSET COMPOSITION AND ITS PREPARATION, AND ABRASIVE-FILLED ARTICLES AND THEIR PREPARATION

CROSS REFERENCE TO RELATED APPLICATIONS

This application is a division of U.S. application Ser. No. 09/681,381 filed Mar. 27 2001 now U.S. Pat. No. 6,593,391, which is incorporated by reference herein.

BACKGROUND OF INVENTION

Abrasive-filled resins are known and employed in the fabrication of abrasive tools such as cutting and grinding wheels. Grinding wheels containing superabrasive materials (e.g., diamond or cubic boron nitride, CBN) in the edge or outer periphery of a circular grinding wheel or grinding cup also are well-known in the fields of sawing, drilling, dressing, grinding, lapping, polishing, and other abrading applications. For these applications, the grit typically is surrounded in a matrix of a metal, such as Ni, Cu, Fe, Co, Sn, W, Ti, or an alloy thereof, or in a resin, such as phenol formaldehyde or other thermosetting polymeric material. By attaching the matrices to a body or other support, tools may be fabricated having the capability to cut through such hard, abrasive materials as concrete, asphalt, masonry, ceramic, brick, granite, marble, and other rock. A typical such wheel is formed from a central metal disk having an aperture or a spindle for spinning the wheel in use. The outer periphery of the wheel, then, has a diamond-containing matrix bonded thereto. For wheels where the diamond is surrounded by a resin, the operator often cures the resin and bonds the resinous segments to the inner wheel by compression molding. Conventional bonding resins are used.

U.S. Pat. No. 5,167,674 describes grinding wheels manufactured from a conventional inner core to which is adhesively bonded a mixture of superabrasive grit, a bis-maleimide-trlazine addition copolymer resin, free-radical initiator, and catalyst. This mixture is compression molded to form a grinding segment annulus.

U.S. Pat. No. 5,314,512 describes injection molding of saw segments from superabrasive particles and a non-porous thermoplastic polymer. The molded saw segments then are affixed to the periphery of a saw blade.

European Patent No. 794,850 B1 describes cutting segments manufactured from superabrasive particles molded with a thermoplastic material wherein the superabrasive particles are oriented in a chosen direction and there is porosity in the molded segments.

U.S. Pat. Nos. 4,054,425 and 4,088,729 describe molding a hub into a phenol-based thermoplastic resin-grinding wheel.

U.S. Pat. No. 3,960,516 describes manufacturing a grinding cup wherein the supporting part is molded as a part of the grinding cup to ensure a secure attachment.

There is a need for curable, abrasive-filled resin compositions that allow fast preparation of cutting and grinding tools having improved wear characteristics.

SUMMARY OF INVENTION

Disclosed herein are several embodiments of a resin composition, its reaction product, a method for its preparation, and articles derived from it.

In one embodiment, a curable resin composition comprises a poly(arylene ether), an acryloyl monomer, an allylic monomer, and an abrasive filler.

In another embodiment, a cured resin composition comprises the reaction product of a poly(arylene ether), an acryloyl monomer, an allylic monomer, and an abrasive filler.

Yet another embodiment is a method of preparing the curable resin composition.

Still other embodiments are articles comprising the cured resin composition and methods for their preparation.

DETAILED DESCRIPTION

A curable resin composition comprises a poly(arylene ether), an acryloyl monomer, an allylic monomer, and an abrasive filler.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula:

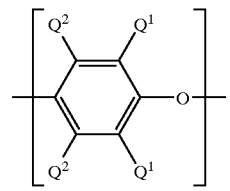

wherein for each structural unit, each $Q^1$ is independently halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_2$–$C_{12}$ halohydrocarbonoxy wherein at least two carbon atoms separate the halogen and oxygen atoms; and each $Q^2$ is independently hydrogen, halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_2$–$C_{12}$ halohydrocarbonoxy wherein at least two carbon atoms separate the halogen and oxygen atoms. Preferably, each $Q^1$ is independently $C_1$–$C_{12}$ alkyl or phenyl, especially $C_{1-4}$ alkyl, and each $Q^2$ is independently hydrogen or methyl.

Both homopolymer and copolymer poly(arylene ether)s are included. In one embodiment, the poly(arylene ether) is a homopolyrner comprising 2,6-dimethyl-1,4-phenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly (arylene ether) in which coupling agents such as low molecular weight polycarbonates, quinones, heterocycles and formals undergo reaction with the hydroxy groups of two poly(arylene ether) chains to produce a higher molecular weight polymer. Poly(arylene ether)s further include combinations of any of the above.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials. Suitable methods for the preparation and isolation of poly(arylene ether)s are disclosed in, for example. U.S. Pat. No. 3,219,625 to Blanchard et al., U.S. Pat. No. 3,306,875 to Hay, U.S. Pat. No. 4,028,341 to Hay, U.S. Pat. No. 4,092,294 to Bennett, Jr. et al., U.S. Pat. No. 4,440,923 to Bartmann et al., and U.S. Pat. No. 5,922,815 to Aycock et al.

In one embodiment, the composition comprises a poly (arylene ether) having less than 500 parts per million (ppm) of free hydroxyl groups. In other words, the poly (arylene ether) contains less than 500 micrograms of hydroxyl groups (as —OH) per gram of poly(arylene ether). The poly(arylene ether) preferably comprises less than 300 ppm of free hydroxyl groups, more preferably less than 100 ppm of free hydroxyl groups.

In one embodiment, the composition comprises a capped poly(arylene ether), which is defined herein as a poly (arylene ether) in which at least 50%, preferably at least 75%, more preferably at least 90%, yet more preferably at least 95%, even more preferably at least 99%, of the free hydroxyl groups present in the corresponding uncapped poly(arylene ether) have been removed by reaction with a capping agent.

The capped poly(arylene ether) may be represented by the structure $Q\text{-}U\text{-}K)_Y$ wherein Q is the residuum of a monohydric, dihydric, or polyhydric phenol, preferably the residuum of a monohydric or dihydric phenol, more preferably the residuum of a monohydric phenol; y is 1 to 100; J comprises recurring units having the structure

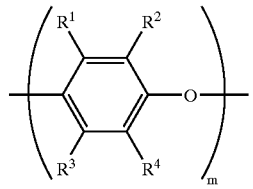

wherein m is 1 to about 200, preferably 2 to about 200, and $R^1\text{-}R^4$ are each independently hydrogen, halogen, primary or secondary $C_1\text{-}C_{12}$ alkyl, $C_2\text{-}C_{12}$ alkenyl, $C_2\text{-}C_{12}$ alkynyl, $C_1\text{-}C_{12}$ aminoalkyl, $C_1\text{-}C_{12}$ hydroxyalkyl, phenyl, $C_{1\text{-}C_{12}}$ haloalkyl, $C_1\text{-}C_{12}$ aminoalkyl, $C_1\text{-}C_{12}$ hydrocarbonoxy, $C_2\text{-}C_{12}$ halohydrocarbonoxy wherein at least two carbon atoms separate the halogen and oxygen atoms, or the like; and K is a capping group produced by reaction of the phenolic hydroxyl groups on the poly(arylene ether) with a capping reagent. The resulting capping group may be

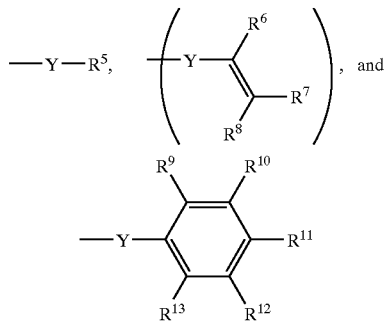

wherein $R^5$ is $C_1\text{-}C_{12}$ alky; $R^6\text{-}R^8$ are each independently hydrogen, $C_1\text{-}C_{12}$ alkyl, $C_2\text{-}C_{12}$ alkenyl, $C_6\text{-}C_{18}$ aryl, $C_7\text{-}C_{18}$ mixed (alkyl-aryl), $C_2\text{-}C_{18}$ alkoxycarbonyl, $C_7\text{-}C_{18}$ aryloxycarbonyl, $C_8\text{-}C_{18}$ mixed (alkyl-aryl)oxycarbonyl, nitrile, formyl, carboxylate, imidate, thiocarboxylate, or the like; $R^9\text{-}R^{13}$ are each independently hydrogen, halogen, $C_1\text{-}C_{12}$ alkyl, hydroxy, amino, or the like; and wherein Y is a divalent group having the structure

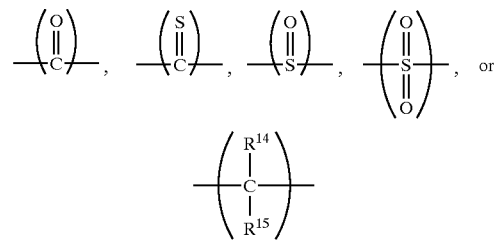

wherein $R^{14}$ and $R^{15}$ are each independently hydrogen, $C_1\text{-}C_{12}$ alkyl, or the like.

In one embodiment, Q is the residuum of a phenol, including polyfunctional phenols, and includes radicals of the structure

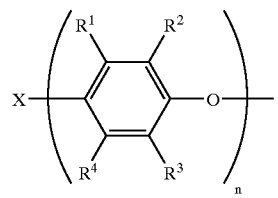

wherein $R^1\text{-}R^4$ are each independently hydrogen, halogen, primary or secondary $C_1\text{-}C_{12}$ alkyl, $C_2\text{-}C_{12}$ alkenyl, $C_2\text{-}C_{12}$ alkynyl, $C_1\text{-}C_{12}$ aminoalkyl, $C_1\text{-}C_{12}$ hydroxyalkyl, phenyl, $C_1\text{-}C_{12}$ haloalkyl, $C_1\text{-}C_{12}$ aminoalkyl, $C_1\text{-}C_{12}$ hydrocarbonoxy, $C_2\text{-}C_{12}$ halohydrocarbonoxy wherein at least two carbon atoms separate the halogen and oxygen atoms, or the like; X is hydrogen, $C_1\text{-}C_{20}$ alkyl, $C_6\text{-}C_{20}$ aryl, $C_7\text{-}C_{20}$ mixed alkyl-aryl hydrocarbons, or such hydrocarbon groups containing a substituent such as carboxylic acid, aldehyde, alcohol, amino, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably 1 to 2. In a preferred embodiment, y=n.

In one embodiment, the capped poly(arylene ether) is produced by capping a poly (arylene ether) consisting essentially of the polymerization product of at least one monohydric phenol having the structure

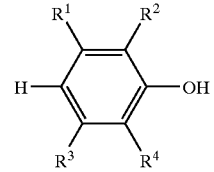

wherein $R^1\text{-}R^4$ are each independently hydrogen, halogen, primary or secondary $C_1\text{-}C_{12}$ alkyl, $C_2\text{-}C_{12}$ alkenyl, $C_{2\text{-}C_{12}}$ alkynyl, $C_{1\text{-}C_{12}}$ aminoalkyl, $C_{1\text{-}C_{12}}$ hydroxyalkyl, phenyl, $C_1\text{-}C_{12}$ haloalkyl, $C_1\text{-}C_{12}$ aminoalkyl, $C_1\text{-}C_{12}$ hydrocarbonoxy, $C_2\text{-}C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol.

In one embodiment, the capped poly(arylene ether) comprises at least one capping group having the structure

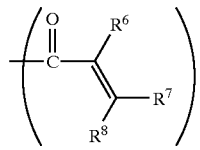

wherein $R^6$–$R^8$ are each independently hydrogen, $C_1$–$C_{12}$ alkyl $C_2$–$C_{12}$ alkenyl, $C_6$–$C_{18}$aryl, $C_7$–$C_{18}$ mixed(alkyl-aryl), $C_2$–$C_{12}$ alkoxycarbonyl, $C_7$–$C_{18}$ aryloxycarbonyl, $C_8$–$C_{18}$ mixed (alkyl-aryl)oxycarbonyl, nitrile, formyl, carboxylate, imidate, thiocarboxylate, or the like. Highly preferred capping groups include acrylate ($R^6$=$R^7$=$R^8$ hydrogen) and methacrylate ($R^6$ methyl, $R^7$=$R^8$=hydrogen).

In one embodiment, the capped poly(arylene ether) comprises at least one capping group having the structure

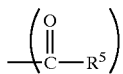

wherein $R^5$ is $C_1$–$C_{12}$ alkyl, preferably $C_1$–$C_6$ alkyl, more preferably methyl, ethyl, or isopropyl. It has surprisingly been found that the advantageous properties of the composition can be achieved even when the capped poly(arylene ether) lacks a polymerizable function such as a carbon-carbon double bond.

In another embodiment, the capped poly(arylene ether) comprises at least one capping group having the structure

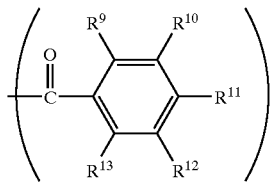

wherein $R^9$–$R^{13}$ are each independently hydrogen, halogen, $C_1$–$C_{12}$ alkyl, hydroxy, amino, or the like. Preferred capping groups of this type include salicylate ($R^9$ is hydroxy, and $R^{10}$–$R^{13}$ are hydrogen).

In one embodiment, the capped poly(arylene ether) is substantially free of amino substituents, including alkylamino and dialkylamino substituents, wherein substantially free means that the capped poly(arylene ether) contains less than about 300 micrograms, preferably less than about 200 micrograms, more preferably less than about 100 micrograms, of atomic nitrogen per gram of capped poly (arylene ether). Although many poly(arylene ether)s are synthesized by processes that result in the incorporation of amino substituents, it has been discovered that thermoset curing rates are increased when the capped poly(arylene ether) is substantially free of amino substituents. Poly (arylene ether)s substantially free of amino substituents may be synthesized directly or generated by heating amino-substituted poly(arylene ether)s to at least about 200° C. Alternatively, if the capped poly(arylene ether) contains amino substituents, it may be desirable to cure the composition at a temperature less than about 200° C.

There is no particular limitation on the method by which the capped poly(arylene ether) is prepared. The capped poly(arylene ether) may be formed by the reaction of an uncapped poly(arylene ether) with a capping agent. Capping agents include compounds that react with phenolic groups. Such compounds include both monomers and polymers containing, for example, anhydride groups, acid chloride groups, epoxy groups, carbonate groups, ester groups, isocyanate groups, cyanate ester groups, alkyl halide groups, or combinations comprising at least one of the foregoing groups. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl) carbonate, acryloyl esters, methacryloyl esters, acetyl esters, phenylisocyanate, 3-isopropenyl-alpha,alpha-dimethylphenylisocyanate, cyanatobenzene, 2,2-bis(4-cyanatophenyl)propane), 3-(alpha-chloromethyl)styrene, 4-(alpha-chloromethyl) styrene, allyl bromide, and the like, carbonate and substituted derivatives thereof, and mixtures comprising at least one of the foregoing capping agents. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; and European Patent No. 261,574 B1 to Peters et al.

A capping catalyst may be employed in the reaction of an uncapped poly(arylene ether) with an anhydride. Examples of such compounds include those that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkyl amines such as tributyl amine, triethylamine, dimethylbenzylamine, dimethylbutylamine, and the like; tertiary mixed alkylarylamines and substituted derivatives thereof such as dimethylaniline, and the like; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like; and mixtures comprising at least one of the foregoing materials. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The composition may comprise a blend of at least two capped poly(arylene ethers). Such blends may be prepared from individually prepared and isolated capped poly(arylene ethers). Alternatively, such blends may prepared by reacting a single poly (arylene ether) with at least two capping agents.

There is no particular limitation on the molecular weight or intrinsic viscosity of the poly(arylene ether). In one embodiment, the intrinsic viscosity, as measured in chloroform at 25° C., may be at least about 0.1 deciliters/gram (dL/g), preferably at least about 0.15dL/g, more preferably at least about 0.20 dL/g. The intrinsic viscosity may be up to about 0.50 dL/g, preferably up to about 0.45 dL/g, more preferably up to about 0.40 dL/g, yet more preferably up to about 0.35 dL/g. Generally, the intrinsic viscosity of a capped, poly(arylene ether) will vary insignificantly from the intrinsic viscosity of the corresponding uncapped poly (arylene ether). It is expressly contemplated to employ blends of at least two capped poly(arylene ether)s having different molecular weights and intrinsic viscosities.

The composition may comprise the poly(arylene ether) in an amount of at least about 10 parts by weight, preferably at least about 14 parts by weight, more preferably at least about 20 parts by weight per 100 parts by weight resin. The composition may comprise the poly(arylene ether) in an amount up to about 50 parts by weight, preferably up to about 45 parts by weight, more preferably up to about 40 parts by weight per 100 parts by weight resin. It will be understood that "100 parts by weight resin" as used herein refers to the combined parts by weight of resinous components such as the poly(arylene ether), the acryloyl monomer, and the allylic monomer; it excludes non-resinous components such as the abrasive filler, and any secondary filler or curing catalyst.

The composition further comprises an acryloyl monomer. The acryloyl monomer comprises at least one acryloyl moiety having the structure

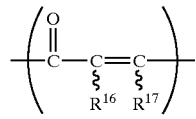

wherein $R^{16}$ and $R^{17}$ are each independently hydrogen or $C_1-C_{12}$ alkyl, and wherein $R^{16}$ and $R^{17}$ may be disposed either cis or trans about the carbon-carbon double bond. Preferably, $R^{16}$ and $R^{17}$ are each independently hydrogen or methyl. In one embodiment, the acryloyl monomer comprises at least two acryloyl moieties having the above structure. In another embodiment, the acryloyl monomer comprises at least three acryloyl moieties having the above structure.

In one embodiment, the acryloyl monomer comprises at least one acryloyl moiety having the structure

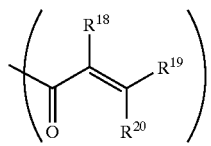

wherein $R^{18}-R^{20}$ are each independently hydrogen, $C_1-C_{12}$ alkyl $C_2-C_{12}$ alkenyl, $C_6-C_{18}$ aryl, $C_7-C_{18}$ mixed (alkyl-aryl), $C_2-C_{12}$ alkoxcarbonyl, $C_7-C_{18}$ aryloxycarbonyl, $C_8-C_{18}$ mixed (alkyl-aryl)oxycarbonyl, nitrile, formyl, carboxylate, imidate, thiocarboxylate, or the like. Preferably, $R^{18}-R^{20}$ are each independently hydrogen or methyl. In one embodiment, the acryloyl monomer comprises at least two acryloyl moieties having the structure above. In another embodiment, the acryloyl monomer comprises at least three acryloyl moieties having the structure above.

Suitable acryloyl monomers include, for example, methyl (meth)acrylate, ethyl (meth)acrylate, isopropyl (meth) acrylate, n-butyl (meth)acrylate, isobutyl (meth) acrylate, 2-ethylhexyl (meth)acrylate, 2-hydroxyethyl (meth)acrylate, 3-hydroxypropyl (meth)acrylate, hydroxybutyl (meth) acrylate, glycidyl (meth)acrylate, 2,2-dimethyl-3-hydroxypropyl (meth)acrylate, isobornyl (meth)acrylate, tetrahydrofurfuryl (meth) acrylate, 3,4-epoxycyclohexylmethyl (meth)acrylate, and the like; halogenated (meth) acrylates such as pentabromobenzyl (meth) acrylate, and the like; and acrylic or methacrylic amides such (meth)acplamide, diacetone (meth)acrylamide, N(2-hydroxyethyl) (meth)acrylamide, N-methyl(meth) acrylamide, N-ethyl(meth)acrylamide, N,N-dimethyl(meth) acrylamide, N,N-dimethylaminopropyl(meth)acrylamide, N,N-dimethylaminopropyl(meth)acrylamide, N,N-dimethylaminoethyl(meth)acrylamide, and the like; and mixtures comprising at least one of the foregoing acryloyl monomers. It will be understood that the suffix (meth)acryl- denotes either acryl- or methacryl-. Additional suitable acryloyl monomers are disclosed in U.S. Provisional Application Serial No. 60/262,571, filed Jan. 18, 2001.

In a preferred embodiment, the acryloyl monomer is substantially free of polymerizable moieties other than acryloyl moieties. For example, in this embodiment, the acryloyl monomer may not comprise an allylic moiety, or a vinyl group directly bonded to an aromatic ring.

The composition may comprise the acryloyl monomer in an amount of at least about 5 parts by weight, preferably at least about 10 parts by weight, per 100 parts by weight resin. The composition may comprise the poly(arylene ether) in an amount up to about 60 parts by weight, preferably up to about 50 parts by weight, more preferably up to about 40 parts by weight per 100 parts by weight resin.

The composition further comprises an allylic monomer. An allylic monomer is herein defined as a monomer comprising an allylic moiety having the structure

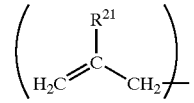

wherein $R^{21}$ may be hydrogen, $C_1-C_6$ alkyl, or the like. In a preferred embodiment, $R^{21}$ is hydrogen. When the allylic monomer comprises at least two allylic moieties, it is termed a polyfunctional allylic monomer.

Allylic monomers may include, for example, allylic alcohols, allyl esters, allyl ethers, and alkoxylated allylic alcohols. Allylic alcohols may have the general structure

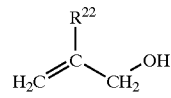

wherein $R^{22}$ is hydrogen or $C_1-C_6$ alkyl. Suitable allylic alcohols include allyl alcohol, methallyl alcohol, 2-ethyl-2-propen-1-ol, and the like, and mixtures comprising at least one of the foregoing allylic alcohols.

Allyl esters may have the general structure

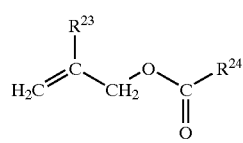

in which $R^{23}$ is hydrogen or $C_1-C_6$ alkyl, and $R^{24}$ is hydrogen or a saturated or unsaturated linear, branched, or cyclic $C_1-C_{30}$ alkyl, aryl, alkylaryl, or aralkyl group. Suitable allyl esters include, for example, allyl formate, allyl acetate, allyl butyrate, allyl benzoate, methallyl acetate, allyl fatty esters, and the like, and mixtures comprising at least one of the foregoing allyl esters.

Allyl ethers may have the general structure

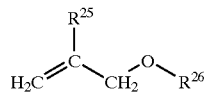

wherein $R^{25}$ is hydrogen or $C_1$–$C_6$ alkyl, and $R^{26}$ is a saturated or unsaturated linear, branched, or cyclic $C_1$–$C_{30}$ alkyl, aryl, alkylaryl, or aralkyl group. Suitable allyl ethers include, for example, allyl methyl ether, allyl ethyl ether, allyl tert-butyl ether, allyl methylbenzyl ether, and the like, and mixtures comprising at least one of the foregoing allyl ethers.

Allylic monomers further include alkoxylated allylic alcohols. Alkoxylated allylic alcohols may have the general structure

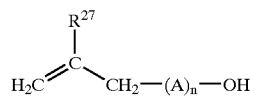

wherein $R^{27}$ is hydrogen or $C_1$–$C_6$ alkyl, A is an oxyalkylene group, and n, which is the average number of oxyalkylene groups in the alkoxylated allylic alcohol, has a value from 1 to about 50. Oxyalkylene groups may include oxyethylene, oxypropylene, oxybutylenes, and mixtures comprising at least one of the foregoing oxyalkylene groups. Alkoxylated allylic alcohols can be prepared by reacting an allylic alcohol with up to about 50 equivalents of one or more alkylene oxides in the presence of a basic catalyst as described, for example, in U.S. Pat. Nos. 3,268,561 and 4,618,703. Alkoxylated allylic alcohols can also be made by acid catalysis, as described, for example, in Journal of the American Chemical Society, volume 71, pages 1152 ff. (1949).

In a preferred embodiment, the allylic monomer is a polyfunctional allylic monomer. Specific polyfunctional allylic monomers include, for example, diallyl adipate, diallyl citraconate, diallyl diglycolate, diallyl ether, diallyl fumarate, diallyl isophthalate, diallyl itaconate, diallyl maleate, diallyl phthalate, diallyl terephthalate, triallyl aconitate, triallyl cyanurate, triallyl isocyanurate, triallyl phosphate, triallyl trimellitate, tetraallyl o-silicic acid, and the like, and mixtures comprising at least one of the foregoing allylic monomers.

In one embodiment, the allylic monomer is substantially free of polymerizable moieties other than allylic moieties. In this embodiment, the allylic monomer may not comprise, for example, an acryloyl moiety, or a vinyl group directly bonded to an aromatic ring.

The composition may comprise the allylic monomer in an amount of at least about 20 parts by weight, preferably at least about 30 parts by weight, more preferably at least about 40 parts by weight, per 100 parts by weight resin. The composition may comprise the allylic monomer in an amount up to about 80 parts by weight, preferably up to about 70 parts by weight, more preferably up to about 65 parts by weight, per 100 parts by weight resin.

The composition further comprises an abrasive filler. Such fillers may have a Knoop hardness of at least about 2,000, preferably at least about 3,000, more preferably at least about 4,000, yet more preferably at least about 5,000, even more preferably at least about 6,000. Suitable hard fillers may comprise, for example, aluminum oxides; silicon carbides; silicon nitrides; sialons; cubic boron nitrides (CBN); aluminosilicates; titanium carbides; chromium carbides; tungsten carbides; zirconium oxides; silicon doped boron-aluminum-magnesium (BAM); natural and synthetic diamonds; garnets; composite ceramics comprising at least one of the foregoing fillers; composite ceramic metals (cermet) comprising a metal and at least one of the foregoing fillers, such as, for example, (tungsten carbide+cobalt) and (chromium carbide+nickel); combinations comprising at least one of the foregoing fillers; and the like. Presently preferred abrasive fillers include those comprising diamond, CBN, and/or BAM.

There is no particular limitation on the particle size of the abrasive filler. The abrasive filler may have a particle size corresponding to about 600 mesh to about 5 mesh, preferably about 300 to about 25 mesh, more preferably about 200 to about 80 mesh.

In one embodiment, the abrasive filler comprises a metal coating. The metal coatings may comprise, for example, Ni, Cu, Cr, Fe, Co, Sn, W, Ti, as well as alloys comprising at least one of the foregoing metals, mixtures comprising at least one of the foregoing metals, and the like.

The composition may comprise the abrasive filler in an amount of at least about 5 parts by weight, preferably at least about 50 parts by weight, more preferably at least about 100 parts by weight, yet more preferably at least about 200 parts by weight, ever more preferably at least about 400 parts by weight, per 100 parts by weight resin. The composition may comprise the abrasive filler in an amount of up to about 2,000 parts by weight, preferably up to about 1,000 parts by weight, more preferably up to about 700 parts by weight, per 100 parts by weight resin. One advantage of the curable composition is its ability to allow high filler contents (higher than those permissible with phenolic resins) while maintaining excellent physical properties. Filler amounts may also be expressed as volume percents of the total composition. Thus, the composition may comprise the abrasive filler in an amount of about 5 to about 95 volume percent, preferably about 10 to about 90 volume percent, more preferably about 50 to about 80 volume percent, based on the total volume of the composition.

The composition may, optionally, further comprise secondary fillers. Secondary fillers may include, for example, abrasives such as ceramic borides, including titanium borides; thermal management particles including, for example, powders comprising Cu, Fe, Sn, or bronze, mixtures of the foregoing metallic powders, and the like; additional fillers such as carbon particles, carbon fibers, silicon, and the like, as well as alloys and mixtures comprising at least one of the foregoing secondary fillers. In applications where electrical conductivity or static dissipation is desirable, preferred carbon fibers may include vapor-grown carbon fibers having an average diameter of about 3.5 to about 500 nanometers as described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; 5,589,152 to Tennent et al.; and U.S. Pat. No. 5,591,382 to Nahass et al. The secondary fillers, when present, may be used in an amount of about 1 to about 30 parts by weight, per 100 parts by weight resin.

The composition may, optionally, further comprise a curing catalyst to increase the curing rate of the unsaturated components. Curing catalysts, also referred to as initiators, are used to initiate the polymerization, cure or crosslink any of numerous thermoplastics and thermosets including unsaturated polyester, vinyl ester and allylic thermosets. Non-limiting examples of curing catalysts are those described in "Plastic Additives Handbook, 4th Edition" R. Gachter and H. Muller (eds.). P. P. Klemchuck (assoc. ed.) Hansen Publishers, New York 1993 and in U.S. Pat. No. 5,407,972 to Smith et al., and U.S. Pat. No. 5,218,030 to Katayose et al. The curing catalyst for the unsaturated portion of the thermoset would include any compound capable of producing radicals at elevated temperatures. Such curing catalysts may include peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha"-bis (t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, and the like, as well as mixtures comprising at least one of the foregoing curing agents. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts.

Those skilled in the art may determine an appropriate amount of curing catalyst without undue experimentation. The curing catalyst amount may be at least about 0.1 part by weight, preferably at least about 1 part by weight, more preferably at least about 2 part by weight, per 100 parts by weight resin. The curing catalyst amount may be up to about 10 parts by weight, preferably up to about 5 parts by weight, per 100 parts by weight resin. It is preferred that the identity and amount of the curing catalyst be selected so as not to compromise the ability to process or maintain the curable formulation in powder form.

In addition to the components described above, the curable resin composition may further comprise one or more additives such as flame retardants, flame retardant synergists, mold release agents and other lubricants, antioxidants, thermal stabilizers, ultraviolet stabilizers, pigments, dyes, colorants, fibrous reinforcements, disc-shaped fillers, low-aspect ratio fillers, synthetic resins, natural resins, thermoplastic elastomers, and the like, as well as reaction products of the foregoing additives, and mixtures comprising at least one of the foregoing additives. Additive amounts may be determined without undue experimentation. Non-limiting examples of additives are those described in "Plastic Additives Handbook, 4th Edition" R. Gachter and H. Muller (eds.), P. P. Klemchuck (assoc. ed.) Hansen Publishers, New York 1993. Many specific additives are also described in U.S. Provisional Application Serial No. 60/262,571, filed Jan. 18, 2001.

In one embodiment, the composition is substantially free of alkenyl aromatic monomers in which an alkenyl substituent is directly bonded to an aromatic ring. By substantially free of alkenyl aromatic monomers, it is meant that such monomers are not intentionally added. Such alkenyl aromatic monomers include, for example, styrene, divinyl benzenes, and vinyl pyridine.

In one embodiment, the composition may be formulated as a powder. For some applications, it may be preferred that the powder be substantially free of particles having any dimension greater than about 300 micrometers, preferably substantially free of particles having any dimension greater than about 150 micrometers, more preferably substantially free of particles having any dimension greater than about 100 micrometers, yet more preferably substantially free of particles having any dimension greater than about 50 micrometers. By substantially free, it is meant that the composition includes less than 5% by weight, preferably less than 2% by weight, more preferably less than 1% by weight of particles having the specified dimensions. In one embodiment, the composition may be formulated as a mixture comprising curable resin particles and abrasive filler particles, with the particle size limitations above applying only to the curable resin particles.

In another embodiment, the composition may be formulated as a pellet using extrusion techniques known in the art.

In order to facilitate handling under ambient conditions and stability of powdered compositions under transportation conditions, it may be preferred that the composition have a melting temperature of at least about 50° C., preferably at least about 60° C., more preferably at least about 70° C. To ensure melting below typical molding temperatures, it may be preferred that the composition have a melting temperature up to about 150° C., preferably up to about 140° C., more preferably up to about 130° C.

In one embodiment, the curable resin composition comprises about 10 to about 50 parts by weight of a poly(arylene ether); about 5 to about 60 parts by weight of an acryloyl monomer; about 20 to about 80 parts by weight of an allylic monomer; and about 5 to about 2,000 parts by weight of an abrasive filler; wherein all parts by weight are based on 100 parts by weight resin.

In one embodiment, the composition comprises about 15 to about 45 parts by weight of a capped poly(arylene ether); about 10 to about 40 parts by weight of a polyfunctional acryloyl monomer; about 30 to about 70 parts by weight of a polyfunctional allylic monomer; and about 100 to about 1,000 parts by weight of an abrasive filler comprising silicon carbide, cubic boron nitride, synthetic diamond, or a mixtures comprising at least one of the foregoing abrasive fillers; wherein all parts by weight are based on 100 parts by weight resin.

It will be understood that the composition encompasses reaction products of any of the above-described curable compositions, as well as articles comprising the cured compositions.

As the composition is defined as comprising multiple components, it will be understood that each component is chemically distinct, particularly in the instance that a single chemical compound may satisfy the definition of more than one component.

There is no particular limitation on the method used to prepared the curable resin composition. In one embodiment, the composition may be prepared by a method comprising blending a poly(arylene ether), an allylic monomer, and an acryloyl monomer to form an intimate blend; and blending the intimate blend and an abrasive filler.

In one embodiment, the composition may be prepared by a method comprising blending a poly(arylene ether) and an allylic monomer to form a first intimate blend; blending the first intimate blend and an acryloyl monomer to form a second intimate blend; processing the second intimate blend to form a curable powder; and blending the curable powder with an abrasive filler. Processing the second intimate blend to form a curable powder may preferably comprise grinding the second intimate blend at a temperature up to about 75°

C., preferably up to about 150° C., more preferably up to about 170° C., yet more preferably up to about 190° C. Such temperatures embrittle the resin, thereby facilitating grinding into small particles. For example, the resin may be cryogenically ground by immersing in liquid nitrogen and allowing to cool to 196° C.; it may then be transferred rapidly into the opening of a grinder in a portion-wise fashion where it may contact a rotating screen of the desired mesh size, passing through the mesh to a collection reservoir. Equipment to perform cryogenic grinding is commercially available from, for example, Retsch/Brinkmann as the ZM-1 Grinder. The method may further comprise blending the curable powder with a curing catalyst.

in one embodiment, the composition may be prepared by a method comprising blending about 20 to about 80 parts by weight of an allylic monomer with about 10 to about 50 parts by weight of a poly(arylene ether) to form a first intimate blend; blending the first intimate blend with about 5 to about 60 parts by weight of an acryloyl monomer to form a second intimate blend; grinding the second intimate blend at a temperature up to about −75° C. to form a first curable powder; blending the first powder with a curing catalyst to form a second curable powder; and blending the second curable powder with about 5 to about 2000 parts by weight of an abrasive filler; wherein all parts by weight are based on 100 parts by weight resin.

Processes useful for processing the composition include injection molding, co-injection molding, reaction injection molding, overmolding, resin transfer molding, vacuum assisted resin transfer molding, Seeman's composite resin infusion manufacturing process (SCRIMP), chemically assisted resin transfer molding, atmospheric pressure molding, open mold casting, wet lay-up, dry lay-up, spray lay-up, sheet molding, bulk molding, filament winding, pultrusion, lamination, and the like, and combinations comprising at least one of the foregoing processes. Additional processes have been described in "Polyesters and Their Applications" by Bjorksten Research Laboratories, Johan Bjorksten (pres.) Henry Tovey (Ch. Lit. Ass.), Betty Harker (Ad. Ass.), James Henning (Ad. Ass.), Reinhold Publishing Corporation, New York, 1956, "Uses of Epoxy Resins", W. G. Potter, Newnes-Buttersworth, London 1975, "Chemistry and Technology of Cyanate Ester Resins" by I. Hamerton, Blakie Academic Publishing an Imprint of Chapman Hall.

There is no particular limitation on the method by which the composition may be cured. The composition may, for example, be cured thermally or by using irradiation techniques, including UV irradiation and electron beam irradiation.

In one embodiment, the resin composition may be formulated as a powder. In this form, it is useful for mixing with other powdered additives to form a dry mix, in that blending is accomplished more readily than when the resin composition is a viscous liquid or paste. Use of the powdered resin composition is particularly advantageous when the abrasive filler comprises the majority of the blend, for example about 70 to about 80 weight percent of the total composition, the balance including the curable resin.

In another embodiment, the resin composition may be formulated as a pellet or other solid form derived from compounding. Compounding procedures known in the art may be useful to improve dispersion and wetting of the abrasive filler, compared to dispersion and wetting achieved with dry powder mixing methods. Dispersion and wetting of abrasive fillers may also be improved by the use of coatings applied to the abrasive filler.

Articles formed using the above processes may be post-mold processed, such as, for example, ground to a particular size or shape, sharpened, annealed, fixtured, or the like. In fact, there is no reason that blades comprising the cured resin composition cannot be sharpened in use. For example, a lawnmower blade comprising the cured, resin composition may be sharpened should the blade become dull or nicked during use. There is virtually no restriction as to the parts that can be made from the curable and cured resin compositions. Presently preferred articles comprising the cured composition include cut-off wheels and grinding wheels, and the like. For example, cut-off wheels molded from the curable resin composition may exhibit a G ratio of at least about 300, preferably at least about 400, more preferably at least about 500, as measured on cemented tungsten carbide, where G ratio is the ratio (volume of work piece removed)/(volume of wheel consumed) as described in "Metals Handbook; Ninth Edition; Volume. 16—Machining" ASM International, page 422 (1989). A specific procedure for determining G ratio values is given in the following examples.

The curable and cured resin compositions are further illustrated by the following non-limiting examples.

EXAMPLE 1

This example describes the preparation of a powdered resin material. Diallyl phthalate (510 grams; obtained from Aldrich as a liquid of 97% purity) was heated to 160–165° C. in a glass reaction vessel. To this was added methacrylate-capped poly (2,6-dimethyl-1,4-phenylene ether) (PPE-MA; 340 grams) having an intrinsic viscosity of 0.25 dL/g as measured at 25° C. in chloroform. The capped poly(arylene ether) was prepared by reaction of the corresponding uncapped poly(arylene ether) with methacrylic anhydride, using procedures described in U.S. patent application Ser. No. 09/440,747, filed Nov. 16, 1999, now abandoned. The mixture was stirred and heated until the poly(arylene ether) completely dissolved. Trimethylolpropane trimethacrylate (TMPTMA; 150 grams; obtained from Sartomer as a neat liquid) was then added to the reaction flask and mixed until it was completely blended. The solution was then poured into a flat container and allowed to cool so that it could form a hardened, wax-like substance. The resin mixture was cooled to −196° C. in liquid nitrogen and rapidly transferred to a Retsch/Brinkmann as the ZM-1 Grinder where it was ground to produce a powdered resin having particle sizes less than about 50 grit. To the powdered resin was then added an initiator, dicumyl peroxide, at 2 weight percent based on total resin weight.

EXAMPLE 2

This example describes the preparation of a curable composition including an abrasive filler. Twenty parts by weight of the powdered resin of Example 1 were combined with 48.5 parts by weight of nickel-coated diamond having 44 weight percent diamond and 56 weight percent nickel, and 31.5 parts by weight of silicon carbide. The nickel-coated diamond had a mesh size of 120–140. The above mixture was placed in a mold having a cavity of nominal dimensions 7 centimeter diameter by 1 centimeter thickness. The mold was then closed and heated to 140° C. as a force of 3 metric tons was applied to compress the resin/abrasive mixture. After 25 minutes, the specimen was removed from the mold and examined. A hardened, crosslinked, disk having good physical integrity was obtained. The sample exhibited a hardness using Rockwell indentor H of 91, a density by the Archimedes method of 100% (no porosity), and a room temperature thermal conductivity of 3.6 watts per meter per Kelvin (W/m/K) indicating complete wetting and adhesion of diamond and silicon carbide grits by resin.

EXAMPLE 3

This example describes the preparation of a curable composition including multiple abrasive fillers, as well as secondary fillers. Eighteen parts by weight of the powdered resin of Example 1 were combined with 27 parts by weight diamond grit having a mesh size of about 120, 35 parts by weight of the nickel-coated diamond of Example 2, 12 parts by weight of titanium boride fines having a mesh size of about −500, and 8 parts by weight of metallic copper fines having a mesh size of about −500. This mixture was placed into a mold having a cavity of nominal dimensions 7 centimeters diameter by 1 centimeter thickness. The mold was closed and heated to 155° C. as a force of 6 metric tons was applied to compress the resin/abrasive mixture. After 30 minutes, the specimen was removed from the mold and examined. A hardened, crosslinked disk having good physical integrity was obtained. The molded disk had a Barcol hardness of 66. The disk was post-cured for 20 hours at 150° C. The post-cured disk had a Barcol hardness of 73.

EXAMPLES 4 AND 5

These examples describe the use of an abrasive-filled composition to mold A1A abrasive cut-off wheels using two curing conditions. The abrasive-filled curable composition of Example 3 was compression molded at a temperature of about 350–375° F. and a pressure of about 20 ton/in2 for 60 minutes to yield a 1A1 cut-off wheel having a wheel diameter of 177.8 millimeters (7.0 inches), a wheel rim width of 6.4 millimeters (0.250 inches), and an abrasive rim depth of 6.4 millimeters (0.250 inches). This grinding wheel corresponds to Example 4, and it had a bond density of 3.384 g/cc and an Rockwell Hardness H scale (HRH) value of 68–74.

The composition and procedure used to prepare Example 4 was used to prepare Example 5, except that the curing temperature was increased to about 700–750° F. and the pressure was increased to 15 ton/in2. This grinding wheel had a bond density of 3.297 g/cc and an HRH value of 100–110.

Cut-off wheels were tested using tungsten carbide (WC) material. Wheel preparation and test conditions are summarized in Table 1. The composition and properties of the WC material are summarized in Table 2. Compositions, molding temperatures, and test results for the cut-off wheels are given in Table 3.

TABLE 1

| ROUGH TRUING | |
| --- | --- |
| Rough Truing Device | Brake |
| Rough Truing Wheel | 3.0 inch diameter x 1.0 inch wide 37C60 MVK Silicon Carbide wheel |
| Rough Truing Conditions | 0.0002 inch–0.0020 inch downfeed x 21.0 inch/min crossfeed |
| WHEEL DRESSING | |
| Dressing Stick | Bay State 1.0 inch x 1.0 inch Aluminum Oxide # 9A240G9V82 |
| Dress Mode | Plunge |
| Dress Plunge Rate | 8 inch/min |
| Dress Amount | 0.30 in$^3$ |
| FINISH TRUING | |
| Finish Truing Device | Brake |
| Finish Truing Wheel | 3.0 inch diameter x 0.090 inch wide MBS-750 Metal-Bond Diamond wheel |
| Mesh size | 60/80 |
| Concentration | 10 volume % |
| Truing Conditions | 0.0001 inch downfeed x 16.0 inch/min crossfeed |
| Number of Passes | 6 |
| GRINDING TEST CONDITIONS | |
| Machine | Brown & Sharpe model 8/24, 15 hp CNC surface grinder |
| Grind Mode | Creepfeed (upcut) |
| Wheel Speed | 5,500 feet/min (28 m/sec) |
| Depth of Cut | 0.040 inch (1.0 mm) |
| Table Speed | 7.5 inch/min (2.3 m/min) |
| Width of Cut | 0.140 inch (3.6 mm) |
| Length of Cut | 3.50 inch (89 mm) |
| Material Removal Rate | 0.30 in$^2$/min (3.2 mm$^3$/mm/sec) |
| Workpiece Material Size | 3.5 inch long x 0.140 inch wide (89 mm x 3.6 mm) |
| Coolant | Master Chemical VHPE 320 water soluble oil at 5% concentration |
| Coolant Flow | 24 gallons/min at 100 psi (entry and exit nozzles) |

TABLE 2

| Designations | | | Compositions (Wt. %) | | | | Properties | | | |
| --- | --- | --- | --- | --- | --- | --- | --- | --- | --- | --- |
| ISO Symbol | Code | US Equiv. | WC | TiC | Ta(Nb) | Co | Density g/cm$^3$ | Avg. Grain Size μm | Hardness HRA | Transverse Rupture Strength (psi) |
| T-11 | P30 | C5 | 72 | 11.5 | 8.5 | 8.5 | 12.4 | 2 | 91.4 | 250,000 |

TABLE 3

|  | Example 3 | Example 4 |
|---|---|---|
| COMPOSITION |  |  |
| diallyl phthalate (pbw) | 51 | 51 |
| PPE-MA (pbw) | 34 | 34 |
| TMPTMA (pbw) | 15 | 15 |
| dicumyl peroxide | 2 | 2 |
| diamond | 150 | 150 |
| nickel-coated diamond | 194 | 194 |
| titanium boride | 67 | 67 |
| copper | 44 | 44 |
| CURING TEMPERATURE (° F.) | 350–375 | 700–750 |
| PROPERTIES |  |  |
| G-ratio, 1 in$^3$ | 393 | 583 |
| Power (kW) | 1.9 | 2.1 |
| Ra (micrometer-inch) | 21 | 13 |

The results in Table 1 show that cut-off wheels prepared from the curable resin composition exhibit low wear rate, high free-cutting capability, and excellent surface finish.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

We claim:

1. An article comprising the reaction product of a curable composition comprising:
   a poly(arylene ether);
   an acryloyl monomer;
   an allylic monomer; and
   an abrasive filler selected from the group consisting of silicon carbides, silicon nitrides, sialons, cubic boron nitrides, aluminosilicates, titanium carbides, chromium carbides, tungsten carbides, zirconium oxides, silicon doped boron-aluminum-magnesium, natural and synthetic diamonds, garnets, composite ceramics comprising at least one of the foregoing abrasive fillers, composite ceramic metals comprising a metal and at least one of the foregoing abrasive fillers, and combinations comprising at least one of the foregoing abrasive fillers.

2. The article of claim 1, wherein the poly(arylene ether) comprises a plurality of structural units of the formula

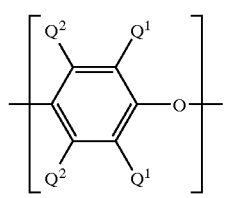

wherein for each structural unit, each $Q^1$ is independently selected from the group consisting of halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, and $C_1$–$C_{12}$ halohydrocarbonoxy wherein at least two carbon atoms separate the halogen and oxygen atoms; and each $Q^2$ is independently selected from the group consisting of hydrogen, halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, and $C_2$–$C_{12}$ halohydrocarbonoxy wherein at least two carbon atoms separate the halogen and oxygen atoms.

3. The article of claim 1, wherein the poly(arylene ether) has a free hydroxyl group content less than about 500 micrograms per gram.

4. The article of claim 1, wherein the poly(arylene ether) comprises a capped poly(arylene ether) having the structure

Q-(J-K)y wherein Q is the residuum of a monohydric, dihydric, or polyhydric phenol; y is 1 to 100; J comprises recurring units having the structure

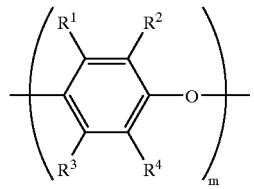

wherein $R^1$–$R^4$ are each independently selected from the group consisting of hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, and $C_2$–$C_{12}$ halohydrocarbonoxy wherein at least two carbon atoms separate the halogen and oxygen atoms; m is 1 to about 200; and K is a capping group selected from the group consisting of

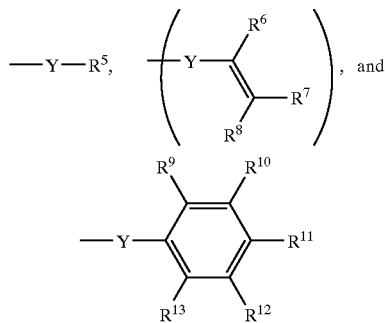

wherein $R^5$ is $C_1$–$C_{12}$ alkyl; $R^6$–$R^8$ are each independently selected from the group consisting of hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, $C_8$–$C_{18}$ mixed (alkyl-aryl)oxycarbonyl, nitrile, formyl, carboxylate, imidate, and thiocarboxylate; $R^9$–$R^{13}$ are each independently selected from the group consisting of hydrogen, halogen, $C_1$–$C_{12}$ alkyl, hydroxy, and amino; and wherein Y is a divalent group selected from the group consisting of

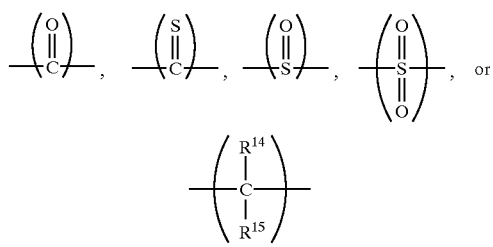

wherein $R^{14}$ and $R^{15}$ are each independently selected from the group consisting of hydrogen and $C_1$–$C_{12}$ alkyl.

5. The article of claim 4, wherein the capped poly(arylene ether) comprises a capping group having the structure

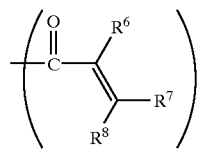

wherein $R^6$–$R^8$ are each independently selected from the group consisting of hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, $C_8$–$C_{18}$ mixed (alkyl-aryl)oxycarbonyl, nitrile, formyl, carboxylate, imidate, and thiocarboxylate.

6. The article of claim 4, wherein the capped poly(arylene ether) is prepared by capping a poly(arylene ether) consisting essentially of the polymerization product of at least one monohydric phenol having the structure

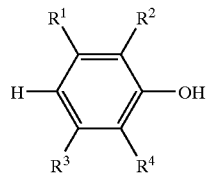

wherein $R^1$–$R^4$ are each independently selected from the group consisting of hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, and $C_2$–$C_{12}$ halohydrocarbonoxy wherein at least two carbon atoms separate the halogen and oxygen atoms.

7. The article of claim 1, wherein the poly(arylene ether) has an intrinsic viscosity of about 0.1 to about 0.5 deciliters/gram in chloroform at 25° C.

8. The article of claim 1, comprising about 10 to about 50 parts by weight of the poly(arylene ether) per 100 parts by weight resin.

9. The article of claim 1, wherein the acryloyl monomer comprises at least one acryloyl moiety having the structure

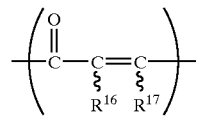

wherein $R^{16}$ and $R^{17}$ are each independently selected from the group consisting of hydrogen and $C_1$–$C_{12}$ alkyl, and wherein $R^{16}$ and $R^{17}$ may be disposed either cis or trans about the carbon-carbon double bond.

10. The article of claim 1, wherein the acryloyl monomer comprises at least one acryloyl moiety having the structure

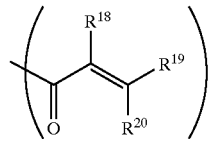

wherein $R^{18}$–$R^{20}$ are each independently selected from the group consisting of hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, mixed $C_8$–$C_{18}$ (alkyl-aryl)oxycarbonyl, nitrile, formyl, carboxylate, imidate, and thiocarboxylate.

11. The article of claim 10, wherein the acryloyl monomer comprises at least two acryloyl moieties.

12. The article of claim 1, wherein the acryloyl monomer is selected from the group consisting of trimethylolpropane trimethacrylate, trimethylolpropane triacrylate, 1,6-hexanediol dimethacrylate, 1,6-hexanediol diacrylate, ethylene glycol dimethacrylate, ethylene glycol diacrylate, propylene glycol dimethacrylate, propylene glycol diacrylate, cyclohexanedimethanol dimethacrylate, cyclohexanedimethanol diacrylate, butanediol dimethacrylate, butanediol diacrylate, diethylene glycol dimethacrylate, diethylene glycol diacrylate, triethylene glycol dimethacrylate, triethylene glycol diacrylate, isobornyl methacrylate, isobornyl acrylate, methyl methacrylate, methyl acrylate, and mixtures comprising at least one of the foregoing acryloyl monomers.

13. The article of claim 1, wherein the acryloyl monomer is selected from the group consisting of trimethylolpropane trimethacrylate, trimethylolpropane triacrylate, and mixtures comprising at least one of the foregoing acryloyl monomers.

14. The article of claim 1, wherein the acryloyl monomer is substantially free of polymerizable moieties other than acryloyl moieties.

15. The article of claim 1, comprising about 5 to about 60 parts by weight of the acryloyl monomer per 100 parts by weight resin.

16. The article of claim 1, comprising about 5 to about 40 parts by weight of the acryloyl monomer per 100 parts by weight resin.

17. The article of claim 1, wherein the allylic monomer comprises an allylic moiety having the structure

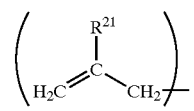

wherein $R^{21}$ is selected from the group consisting of hydrogen and $C_1$–$C_6$ alkyl.

18. The article of claim 17, wherein the allylic monomer comprises at least two allylic moieties.

19. The article of claim 1, wherein the allylic monomer is selected from the group consisting of allyl alcohol, methallyl alcohol, 2-ethyl-2-propen-1-ol, allyl formate, allyl acetate, allyl butyrate, allyl benzoate, methallyl acetate, allyl fatty esters, allyl methyl ether, allyl ethyl ether, allyl tert-butyl ether, allyl methylbenzyl ether, alkoxylated allylic alcohols, diallyl adipate, diallyl citraconate, diallyl diglycolate, diallyl ether, diallyl fumarate, diallyl isophthalate, diallyl itaconate, diallyl maleate, diallyl phthalate, diallyl terephthalate, triallyl aconitate, triallyl cyanurate, triallyl isocyanurate, triallyl phosphate, triallyl trimellitate, tetraallyl o-silicic acid, and mixtures comprising at least one of the foregoing allylic monomers.

20. The article of claim 1, wherein the allylic monomer is selected from the group consisting of diallyl adipate, diallyl citraconate, diallyl diglycolate, diallyl ether, diallyl fumarate, diallyl isophthalate, diallyl itaconate, diallyl maleate, diallyl phthalate, diallyl terephthalate, triallyl aconitate, triallyl cyanurate, triallyl isocyanurate, triallyl phosphate, triallyl trimellitate, tetraallyl o-silicic acid, and mixtures comprising at least one of the foregoing allylic monomers.

21. The article of claim 1, wherein the allylic monomer comprises diallyl phthalate.

22. The article of claim 1, wherein the allylic monomer is substantially free of polymerizable moieties other than allylic moieties.

23. The article of claim 1, comprising about 20 to about 80 parts by weight of the allylic monomer per 100 parts by weight resin.

24. The article of claim 1, wherein the abrasive filler has a Knoop hardness of at least about 2,000.

25. The article of claim 1, wherein the abrasive filler has a mesh size of about 600 to about 5.

26. The article of claim 1, wherein the abrasive filler comprises a metal coating.

27. The article of claim 26, wherein the metal coating comprises a metal selected from the group consisting of Ni, Cu, Cr, Fe, Co, Sn, W, Ti, alloys comprising at least one of the foregoing metals, and mixtures comprising at least one of the foregoing metals.

28. The article of claim 1, wherein the abrasive filler is selected from the 8 group consisting of silicon carbides; cubic boron nitrides; natural and synthetic diamonds; composite ceramic metals comprising a metal and at least one of the foregoing fillers; and combinations comprising at least one of the foregoing abrasive fillers.

29. The article of claim 1, comprising up to about 2,000 parts by weight of the abrasive filler per 100 parts by weight resin.

30. The article of claim 1, comprising at least about 5 parts by weight of the abrasive filler per 100 parts by weight resin.

31. The article of claim 1, comprising at least about 300 parts by weight of the abrasive filler per 100 parts by weight resin.

32. The article of claim 1, comprising at least about 400 parts by weight of the abrasive filler per 100 parts by weight resin.

33. The article of claim 1, further comprising a secondary filler selected from the group consisting of ceramic borides, Cu, Fe, Sn, bronze, C, silica, alumina, Si, and mixtures comprising at least one of the foregoing secondary fillers.

34. The article of claim 1, wherein the curable composition further comprises a curing catalyst.

35. The article of claim 34, wherein the curing catalyst is selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha-bis(t-butylperoxy-m-isopropyl) benzene, 2,5-dimethyl-2,5-di(t-butylperoxy)hexane, dicumylperoxide, di(t-butylperoxy isophthalate, t-butylperoxybenzoate, 2,2-bis (t-butylperoxy)butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, 2,3-dimethyl-2,3-diphenylbutane, 2,3-trimethylsilyloxy-2,3-diphenylbutane, and mixtures comprising at least one of the foregoing curing catalysts.

36. The article of claim 34, comprising about 0.1 to about 10 parts by weight of the curing catalyst per 100 parts by weight resin.

37. The article of claim 1, wherein the mixture further comprises an additive selected from the group consisting of flame retardants, flame retardant synergists, mold release agents and other lubricants, antioxidants, thermal stabilizers, ultraviolet stabilizers, pigments, dyes, colorants, anti-static agents, fibrous reinforcements, disc-shaped fillers, low-aspect ratio fillers, synthetic resins, natural resins, thermoplastic elastomers, and mixtures comprising at least one of the foregoing additives.

38. The article of claim 1, wherein the mixture is substantially free of alkenyl aromatic monomers in which an alkenyl substituent is directly bonded to an aromatic ring.

39. The article of claim 1 in the form of a grinding wheel.

40. The article of claim 1 in the form of a cut-off wheel.

41. The cut-off wheel of claim 40, having a G ratio of at least about 300 measured on cemented tungsten carbide.

42. An article comprising the reaction product of a curable composition comprising:
    about 10 to about 50 parts by weight of a poly(arylene ether);
    about 5 to about 60 parts by weight of an acryloyl monomer;
    about 20 to about 80 parts by weight of an allylic monomer; and
    about 5 to about 2,000 weight percent of an abrasive filler;
    wherein all parts by weight are based on 100 parts by weight resin.

43. An article comprising the reaction product of a curable composition comprising:
    about 15 to about 45 parts by weight of a capped poly (arylene ether);
    about 10 to about 40 parts by weight of a polyfunctional acryloyl monomer;
    about 30 to about 70 parts by weight of a polyfunctional allylic monomer; and
    about 100 to about 1,000 parts by weight of an abrasive filler comprising
    silicon carbide, cubic boron nitride, or synthetic diamond;
    wherein all parts by weight are based on 100 parts by weight resin.

44. A method of forming an abrasive-filled article, comprising:
    molding a curable composition comprising a poly(arylene ether), an acryloyl monomer, an allylic monomer, and an abrasive filler selected from the group consisting of silicon carbides, silicon nitrides, sialons, cubic boron nitrides, aluminosilicates, titanium carbides, chromium carbides, tungsten carbides, zirconium oxides, silicon doped boron-aluminum-magnesium, natural and synthetic diamonds, garnets, composite ceramics comprising at least one of the foregoing abrasive fillers, composite ceramic metals comprising a metal and at least one of the foregoing abrasive fillers, and combinations comprising at least one of the foregoing abrasive fillers to form a molded article; and
    curing the molded article.

45. The method of claim 44, wherein the molding comprises using a molding method selected from the group consisting of injection molding, co-injection molding, reaction injection molding, overmolding, resin transfer molding, vacuum assisted resin transfer molding, Seeman's composite resin infusion manufacturing process (SCRIMP), chemically assisted resin transfer molding, atmospheric pressure molding, open mold casting, wet lay-up, dry lay-up, spray lay-up, sheet molding, bulk molding, filament winding, pultrusion, lamination, and combinations comprising at least one of the foregoing molding methods.

46. The method of claim 44, wherein the curing comprises curing with thermal energy, ultraviolet light irradiation, or electron beam irradiation.

47. An article formed by the method of claim 44.

48. A grinding wheel formed by the method of claim 44.

49. A cut-off wheel formed by the method of claim 45.

* * * * *

UNITED STATES PATENT AND TRADEMARK OFFICE
CERTIFICATE OF CORRECTION

PATENT NO. : 6,770,107 B2
APPLICATION NO. : 10/248587
DATED : August 3, 2004
INVENTOR(S) : Hua Guo et al.

It is certified that error appears in the above-identified patent and that said Letters Patent is hereby corrected as shown below:

Column 1,
Line 38, before "addition", delete "trlazine" and insert therefor --triazine--.

Column 2,
Line 48, after "a", delete "homopolyrner" and insert therefor --homopolymer--.

Column 7,
Line 11, after "about" (first occurrence), delete "14" and insert therefor --15--.
Line 54, after "$C_2$-$C_{12}$", delete "alkoxcarbonyl" and insert therefor --alkoxycarbonyl--.

Column 8,
Line 6, after "(meth)", (first occurrence) delete "acplamide" and insert therefor --acrylamide--.

Column 13,
Line 15, before "one", delete "in" and insert therefor --In--.

Signed and Sealed this

Twenty-second Day of August, 2006

JON W. DUDAS
*Director of the United States Patent and Trademark Office*